United States Patent
Hite et al.

[11] Patent Number: 5,901,963
[45] Date of Patent: May 11, 1999

[54] GAS NITRIDED TAPER FACED KEYSTONE PISTON RING INCORPORATING A SEALING LAND AND ORIENTATION GROOVE

[75] Inventors: Russell E. Hite; John C. Lahrman, both of Richmond, Ind.; Hugo A. Rita, Santa Fe, Argentina

[73] Assignee: Dana Corporation, Toledo, Ohio

[21] Appl. No.: 08/741,069

[22] Filed: Oct. 30, 1996

[51] Int. Cl.[6] .................................. F16J 9/12; F16J 9/20
[52] U.S. Cl. .......................... 277/321; 277/435; 277/443; 277/460
[58] Field of Search ................................ 277/435, 443, 277/459, 460, 321

[56] References Cited

U.S. PATENT DOCUMENTS

| | | |
|---|---|---|
| 1,381,993 | 6/1921 | Hill et al. . |
| 1,814,355 | 7/1931 | Williams . |
| 1,862,983 | 6/1932 | Roberts . |
| 2,387,855 | 10/1945 | Phillips ................................... 277/460 |
| 2,522,764 | 9/1950 | Roberts ................................... 277/460 |
| 2,608,452 | 8/1952 | Hollingsworth ........................ 277/460 |
| 3,554,564 | 1/1971 | Lassanske . |
| 3,554,568 | 1/1971 | Heid, Jr. ................................. 277/459 |
| 3,826,508 | 7/1974 | Packard ................................... 277/460 |
| 4,123,072 | 10/1978 | Sharpe . |
| 4,256,318 | 3/1981 | Bush . |
| 4,407,515 | 10/1983 | Naito ..................................... 277/443 |
| 4,877,257 | 10/1989 | Ide . |
| 5,241,748 | 9/1993 | Ishida ................................. 29/888.074 |
| 5,295,696 | 3/1994 | Harayama et al. ..................... 277/443 |
| 5,308,089 | 5/1994 | Ishida ..................................... 277/443 |

*Primary Examiner*—Anthony Knight
*Assistant Examiner*—John L. Beres
*Attorney, Agent, or Firm*—Radar, Fishman & Grauer PLLC

[57] ABSTRACT

A piston ring having a keystone shape and an orientation feature on one of its surfaces for ensuring proper orientation of the ring during installation. The piston ring preferably has an outer peripheral surface that includes a sealing land with a nitride hardened surface to resist wear during the service life of the piston ring. A tapered surface is also provided on the outer peripheral surface adjacent to the sealing land.

16 Claims, 1 Drawing Sheet

GAS NITRIDED TAPER FACED KEYSTONE PISTON RING INCORPORATING A SEALING LAND AND ORIENTATION GROOVE

FIELD OF THE INVENTION

The present invention relates to a piston ring, and more particularly to a keystone shaped piston ring having an orientation feature for ensuring proper installation. The piston ring includes an outer peripheral surface having a sealing land with a nitride hardened surface and a tapered surface located adjacent the sealing land.

BACKGROUND OF THE INVENTION

Piston rings are well known. They are usually received within an annular groove disposed about an outer periphery of a piston. In turn, the piston is reciprocable within a cylinder. The piston compresses fluids such as gases within a combustion chamber of the cylinder. In the case of an internal combustion engine, these fluids are ignited and expand, forcing the piston away from the point of ignition. The primary function of the piston ring is to provide an effective seal of the combustion gases, called "blow-by control". A secondary function of the piston ring is to prevent excess lubricating oil from entering the combustion chamber. To accomplish these sealing functions, the piston ring must constantly and fully contact the cylinder. Expanding gases tend to force the piston ring radially outwardly against the cylinder which aids in sealing. However, the design of the piston ring also plays an important role in sealing.

It is known to design a piston ring having a cross section in the shape of a keystone, i.e. a trapezoid. The keystone shape allows the expanding gases to more easily force the piston ring radially outwardly.

It is also known to taper an entire outer peripheral surface of a piston ring. The taper is provided for initial break-in only and is designed to have point contact between the piston ring and cylinder. After wearing in of the piston ring, the entire outer peripheral face fully contacts the cylinder.

In another known piston ring there is a projection at the uppermost portion of the outer peripheral face which is designed to wear away during initial break-in. After break-in, the entire outer peripheral surface acts as the sealing surface.

None of the prior art piston rings have a hardened sealing land that projects from the outer peripheral surface designed to seal against the cylinder during the entire service life of the piston ring. Moreover, none of the prior art designs taper only a portion of the outer peripheral surface in combination with a sealing land. Finally, prior art piston rings do not have an orientation feature that ensures proper orientation during installation.

SUMMARY OF THE INVENTION

The present invention is directed to a piston ring having a generally annular body with a keystone shaped cross-section including a top surface, a bottom surface, an inner peripheral surface, and an outer peripheral surface. The piston ring of the instant invention has an orientation feature on at least one of the surfaces for visually indicating a proper orientation during installation of the piston ring onto a piston. The orientation feature reduces the chances that the piston ring might be installed upside down.

Another feature of the instant invention is improved sealing. A more effective sealing arrangement is realized by providing a sealing land on the outer peripheral surface. The sealing land includes a hardened surface to resist wearing of the sealing land throughout the entire service life of the piston ring. The hardened surface can be produced, for example, by gas nitriding. One advantage of the sealing land is that force loads on the piston ring outer peripheral surface are concentrated on a smaller area of contact with the cylinder which improves sealing.

In addition, a tapered portion is provided on the outer peripheral surface adjacent to the sealing land. The tapered portion is angled radially inwardly from the sealing land toward one of the top or bottom surfaces. In a preferred embodiment, the sealing land is provided on a lower half of the outer peripheral surface and the tapered portion extends from the sealing land to the top surface so that a twisting force can be imparted to the piston ring by expanding gases to improve sealing.

A piston ring made according to the present invention requires fewer process steps because the piston ring is formed from a drawn wire having most of the above features formed during drawing. Only finishing operations such as final grinding, nitriding and lapping are needed. The nitriding eliminates the need for chrome plating while providing equivalent wear resistance. Therefore, the piston ring of the present invention is less expensive to produce than prior art piston rings and utilizes environmentally cleaner processes.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
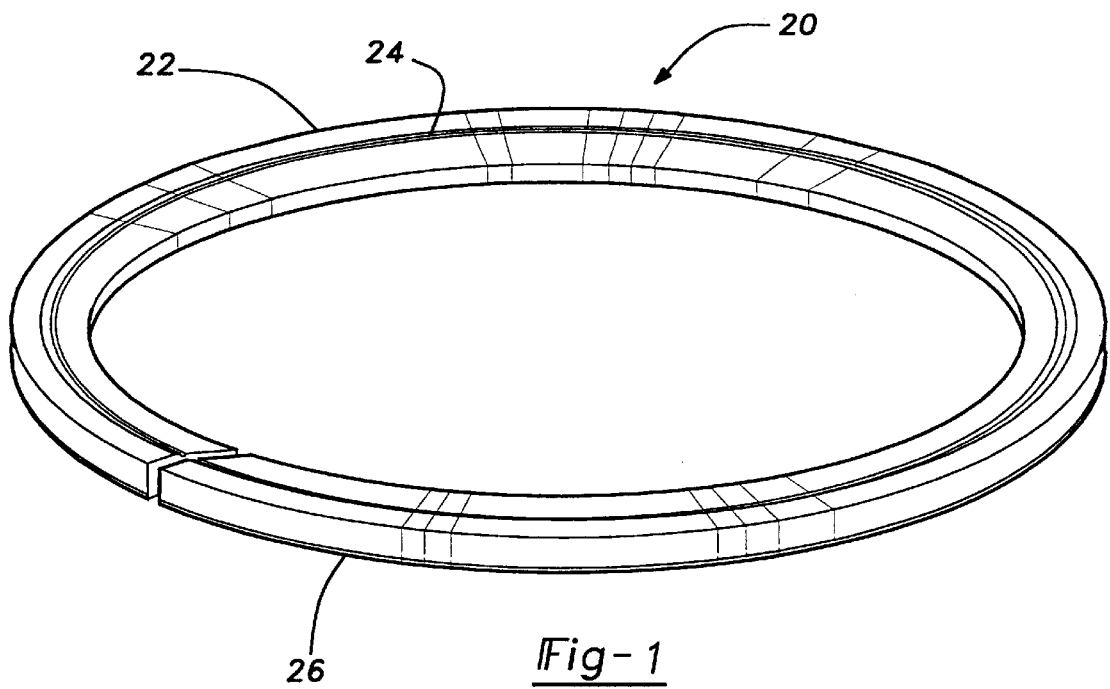
FIG. 1 is a perspective view of a piston ring according to the present invention.

FIG. 1 illustrates a piston ring 20 according to the present invention including a generally annular body 22 having an orientation feature 24 and a sealing land 26.

Figure 2:
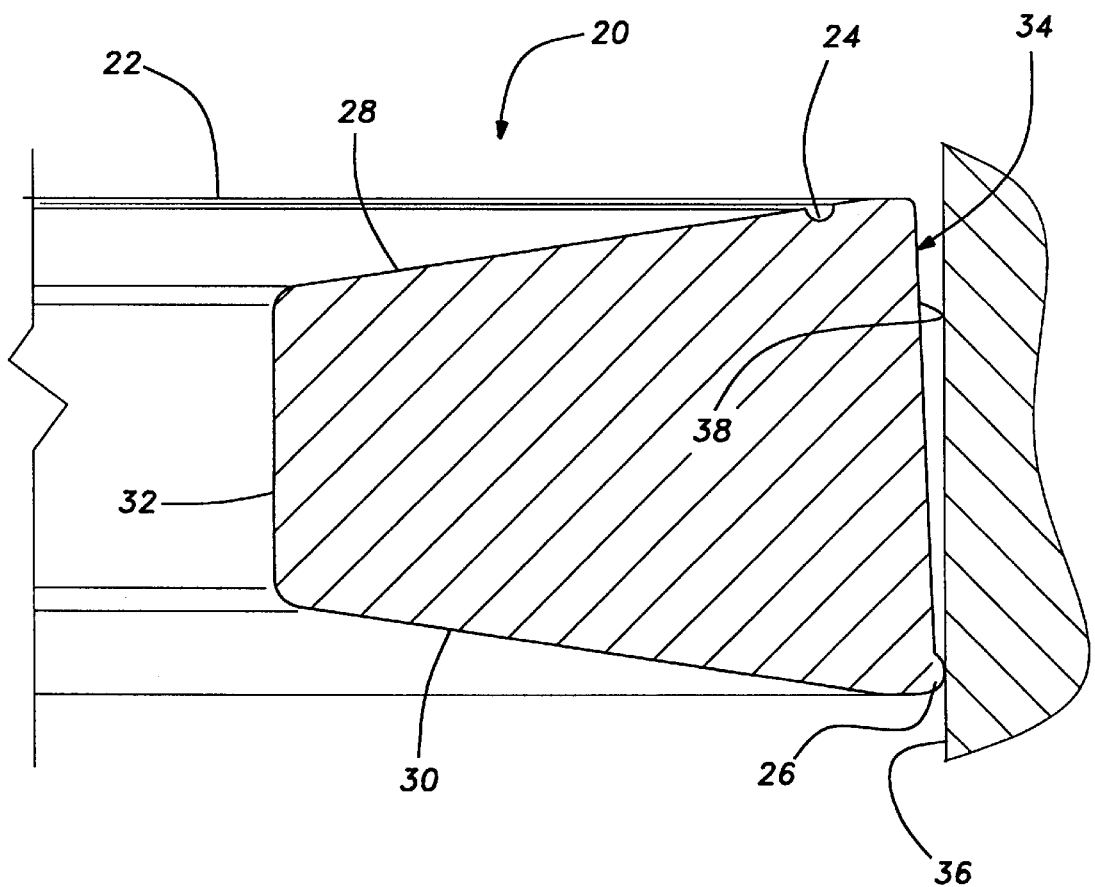
FIG. 2 is a sectional view of a piston ring according to the present invention adjacent a cylinder.

As shown in FIG. 2, annular body 22 includes top surface 28, bottom surface 30, inner peripheral surface 32 and outer peripheral surface 34. Although annular body 22 can have any cross-sectional shape, a preferred shape is a keystone or trapezoidal shape wherein top surface 28 and bottom surface 30 are angled with respect to inner peripheral surface 32. Annular body 22 is formed from a drawn wire, preferably a martensitic stainless steel wire, for example, 420 or 440B stainless steels, hardened and tempered to approximately 35–40 Rockwell 'C'. However, other suitable materials may be utilized and processing can be different, for example extruding instead of drawing.

Orientation feature 24 can be located on any of piston ring surfaces 28,30,32,34. Orientation feature 24 has only a single function, namely to provide a visual indication for ensuring that piston ring 20 is properly oriented during installation onto a piston (not shown). Orientation feature 24 is preferably formed during drawing, thereby eliminating the need for separate machining operations. As a result, orientation feature 24 is continuously formed about the periphery of piston ring 20 and is substantially coaxial therewith. Orientation feature 24 is also preferably formed as a groove located on top surface 24 so as to be readily observed during installation. However, it is envisaged that orientation feature 24 can also be non-continuous or of different shapes or forms which still accomplish the visual indication function. By way of examples, a single indentation, a series of knurls, a protrusion, or a mark may be used for visually indicating proper piston ring orientation.

Piston ring 20 further includes a sealing land 26 disposed along outer peripheral surface 34 for sealing engagement against cylinder 36. Sealing land 26 is also preferably formed during drawing. In the preferred embodiment shown, sealing land 26 is located on outer peripheral surface 34 adjacent to bottom surface 30 to provide improved sealing benefits. However, sealing land 26 may be located anywhere along outer peripheral surface 34. Sealing land 26 serves to concentrate expanding radial forces of piston ring 20 at a reduced area of contact with cylinder 36. Force concentration at sealing land 26 provides improved sealing of combustion gases and prevents excess lubricant from leaking past piston ring 20. Sealing land 26 preferably extends 0.002 inch in the radial direction and 0.002 inch in the longitudinal direction. Although sealing land 26 may have any known shape, a preferred shape is semi-circular since that shape is easily formed by extruding and provides excellent sealing characteristics.

Adjacent sealing land 26 is a tapered portion 38 that is angled radially inwardly from sealing land 26 toward either top surface 28 or bottom surface 30. Tapered portion 38 can be located on either side of sealing land 26 or on both sides. Preferably, tapered portion 38 is located between sealing land 26 and top surface 28 so that a twisting force can be imparted to piston ring 20. A twisting force is produced when expanding combustion gases act against tapered portion 38. Such a twisting force tends to force sealing land 26 radially outwardly and thereby improves sealing. In the preferred embodiment, tapered portion 38 has a taper angle of approximately 1 to 2 degrees from vertical.

In addition, all piston ring surfaces 28,30,32,34, including sealing land 26, are hardened by a hardening operation that imparts wear resistance and improves sealing characteristics of piston ring 20. Preferably, hardening is accomplished using a gas nitriding process that creates surface hardnesses of approximately 900–1400 VHN and provides a hardened case depth of approximately 0.004 inch. One advantage of gas nitriding is that it is environmentally cleaner than standard chrome plating processes while still producing an equivalent hardened surface.

Sealing land 26 is hardened to resist wear during the entire service life of piston ring 20. Sealing land 26 is not merely a feature designed to wear away during initial break-in of a piston/cylinder device. Sealing land 26 is designed to function throughout the entire operating life of piston ring 20. After hardening, a lapping operation may optionally be performed on piston ring 20 so that sealing land 26 is correctly sized and smooth to better fit and seal a respective cylinder. Lapping may reduce the radial extension of sealing land 26 by up to approximately 0.001 inch.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A piston ring for use with a piston located in a cylinder comprising:

a generally annular body having a top surface, a bottom surface, an inner peripheral surface and an outer peripheral surface;

said outer peripheral surface including a sealing land for concentrating force loads of said piston ring against said cylinder;

said sealing land has a hardened surface for resisting wear during an entire service life of said piston ring; and wherein said sealing land is located on a lower half of said outer peripheral surface and said outer peripheral surface further comprises a tapered portion adjacent said sealing land that extends radially inwardly up to said top surface.

2. The piston ring of claim 1, wherein said sealing land is adjacent to said bottom surface.

3. The piston ring of claim 1, wherein said tapered portion has a taper of approximately 1 to 2 degrees.

4. The piston ring of claim 1, wherein said hardened surface is a nitrided surface.

5. The piston ring of claim 4, wherein said hardened surface has a hardness of approximately 900–1400 VHN.

6. The piston ring of claim 1, wherein said sealing land has a semi-circular shaped cross-section.

7. The piston ring of claim 1, wherein said sealing land extends approximately 0.002 inch in a radial direction.

8. The piston ring of claim 1, wherein said sealing land extends approximately 0.002 inch in a longitudinal direction.

9. The piston ring of claim 1, wherein said piston ring has a keystone shaped cross-section.

10. A piston ring for use with a piston in a cylinder comprising:

a generally annular body having a top surface, a bottom surface, and inner peripheral surface and an outer peripheral surface;

an orientation feature on one side surfaces for providing a visual indication to ensure that said piston ring is properly oriented during installation;

said outer peripheral surface including a sealing land having a semi-circular cross-section for concentrating force loads of said piston ring against said cylinder, said sealing land having a hardened surface for resisting wear during an entire service life of said piston ring; and said outer peripheral surface having a tapered portion adjacent said sealing land.

11. The piston ring of claim 10, further comprising a keystone shaped cross-section.

12. The piston ring of claim 10, wherein said orientation feature is located on one of said top or said bottom surfaces.

13. The piston ring of claim 12, wherein said orientation feature is selected from at least one of a groove, a protrusion, and an indentation.

14. The piston ring of claim 13, said piston ring has a cross-sectional shape of a keystone and wherein said orientation feature is located substantially all the way around said top surface.

15. The piston ring of claim 13, wherein said orientation feature has a generally annular shape.

16. The piston ring of claim 15, wherein said orientation feature is substantially coaxial with said piston ring.

\* \* \* \* \*

UNITED STATES PATENT AND TRADEMARK OFFICE
CERTIFICATE OF CORRECTION

PATENT NO. : 5,901,963
DATED : May 11, 1999
INVENTOR(S) : Russell E. Hite, et. al.

It is certified that error appears in the above-indentified patent and that said Letters Patent is hereby corrected as shown below:

Col. 4, line 31
replace "and"
with --an--.

Signed and Sealed this

Thirtieth Day of November, 1999

Attest:

Q. TODD DICKINSON

Attesting Officer

Acting Commissioner of Patents and Trademarks